Figure 1:
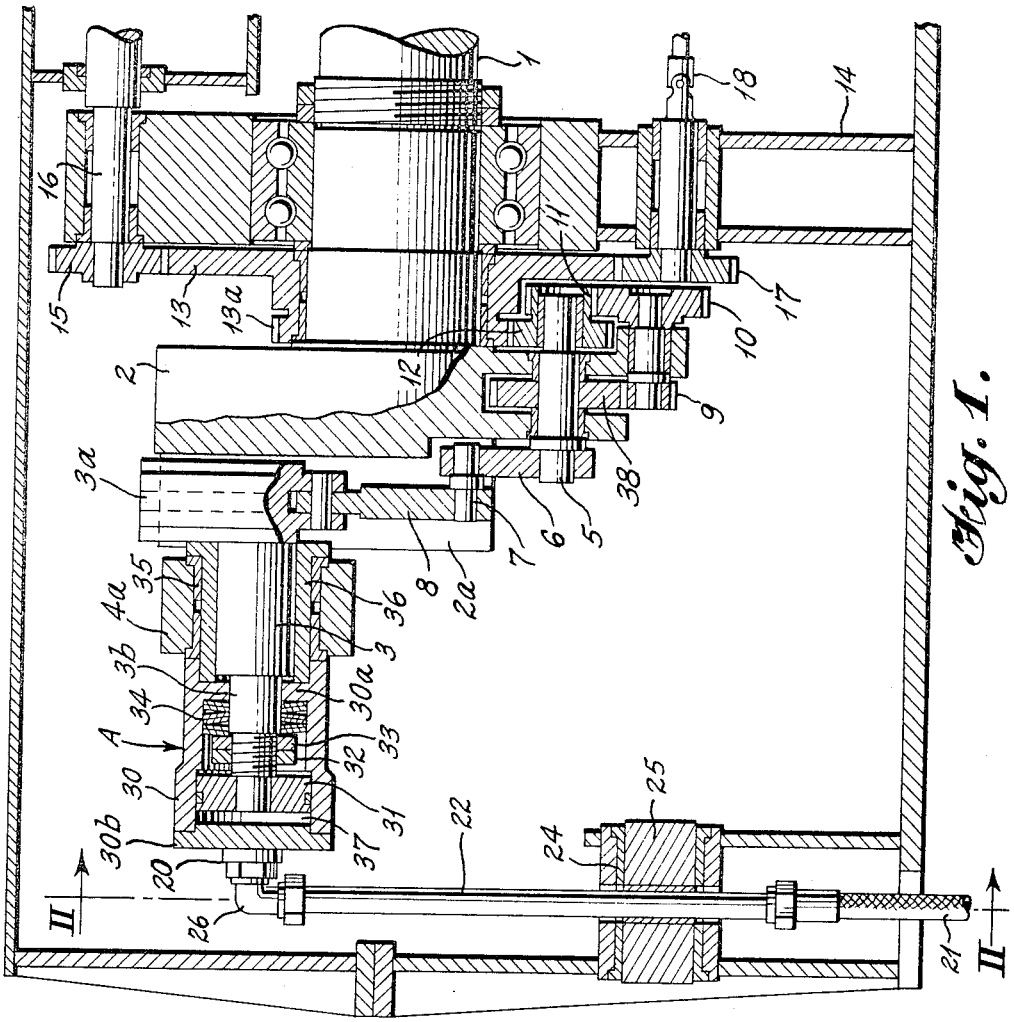

Aug. 30, 1966   W. WALDURA ET AL   3,269,220
DRIVING ARRANGEMENT FOR THE OSCILLATING MOVEMENT OF THE SHEAR
FRAME OF FLYING SHEARS FOR CONTINUOUSLY MOVING ROLLING STOCK
Filed April 13, 1964

United States Patent Office 3,269,220
Patented August 30, 1966

3,269,220
DRIVING ARRANGEMENT FOR THE OSCILLAT-
ING MOVEMENT OF THE SHEAR FRAME OF
FLYING SHEARS FOR CONTINUOUSLY MOVING
ROLLING STOCK
Walter Waldura and Josef Fatscher, St. Ingbert, Saar,
Germany, assignors to Verwaltungsgesellschaft Moeller
und Neumann Offene Handelsgesellschaft, Saar, Germany
Filed Apr. 13, 1964, Ser. No. 359,422
Claims priority, application Germany, Apr. 13, 1963,
V 23,938
8 Claims. (Cl. 74—837)

This invention relates to a novel drive for the oscillating movement of the shear frame of flying shears for cutting continuously moving rolling stock in which the crank stud with its slide shoe is radially guided and adjustable in a crank disk of the oscillating crank shaft for varying the oscillation range of the shear frame by means of an adjustable device, for example by a spindle and an adjusting nut. The variation of the oscillation range of the shear frame is required in order to adjust the translational speed of the blades to the speed of rolling stock during the cutting operation. The particular crank stroke which determines the oscillating range and which is set for a particular cutting operation is secured in the usual manner so that it does not change during operation.

It is already known to insert double eccentrics in the lugs of the two connecting rods providing the oscillating movement of the shear frame, the double eccentrics being arranged so as to be adjustable relative to each other on a counter shaft. With this double eccentric arrangement the oscillating range may be adjusted during the operation of the flying shears but a complex drive is required. It is evident that while the shears are operating it is not possible to change over to another cutting length as long as the stock is moving through the shears, the change in a cutting length requiring a correction of the oscillating amplitude or range, and this complex prior art arrangement is justified only, or even necessary, because a mechanical, infinitely variable drive is employed for varying the rotating speed of the main crank shaft, which drive can be adjusted only while in operation. The present invention purposely rejects the possibility of adjusting the oscillating amplitude during the operation of the shears because of the recognition that with the use of a hydraulic adjustment of the rotating speed, for example with an oil motor, all the adjustments for a different cutting length may be carried out at a standstill, so that only the problem of the stroke adjustment of the conventional connecting rod drives of flying shears remains to be solved by simple mechanization, so that when the shears are standing still no manual operations are necessary. The stroke adjustment is to be initiated and controlled from the control board.

The mechanization of the stroke adjustment of the above described connecting rod drives for oscillating shears is obtained according to the invention in that the adjusting device as actuated by a drive carried by and rotating with the crank disk and incorporating an eccentrically mounted gear which is operatively connected to a gear which is mounted freely rotatably on the oscillating crank shaft and is adjustable relative to the oscillating crank shaft by means of a stationary drive. In view of the fact that while the shears are rotating the radially adjustable crank stud is fixed, the adjusting device and the operational connection to the adjustable gear are also blocked so that the gear is rotated. This is made possible in that the stationary drive for the adjustment of the gear acts on the gear over a non self-blocking drive step. In this manner the adjusting motor may rotate without current.

After the shears are standing still and the safety for the crank stud is released, the stroke of the gear, the adjusting device, for example an adjusting spindle, and finally the crank stud of the connecting rod drive may be reset by the adjusting motor.

In the case where a self-blocking drive step is provided in the stationary drive for the adjustable gear, for example a worm drive, a coupling is arranged between the self-blocking drive and the adjustable gear, preferably a magnetic coupling which may be actuated by remote control.

The adjusting arrangement consists preferably of a co-rotating adjusting crank or eccentric shaft which is mounted in the crank disk, the connecting rod of this shaft being articulated on the slide shoe of the crank stud. The adjustment over an intermediate crank drive operates faster than over an adjusting spindle and nut.

The particular set stroke of the crank stud is transferred by an electrical conducting shaft to the control board, this shaft being connected to the adjustable gear and indicating its rotary position. As the gear co-rotates constantly due to the blocking of the drive connection to the crank stud, and as it does not carry out any relative movement with respect to the crank disk supporting the setting crank shaft, the indication of the electrical shaft must be disconnected while the shears are operating. In this manner the previously set length of the crank stroke or of the oscillating amplitude is retained.

As described above, the mechanization can be carried out only with respect to the stroke adjustment. The releasing of the safety of the crank stud could still be carried out manually as it requires only a simple movement by hand. According to the invention, the connecting rod drive is further improved in that the safety device for the adjusted crank stroke consists of a hydraulically or pneumatically operable clamping device for securing one of the adjustable parts carried by the crank disk, wherein the pressure medium is introduced into the rotating clamping device by employing a flexible line. A specific embodiment of the clamping arrangement as well as of the feeding of the pressure medium will be described in greater detail hereafter.

Figure 2:
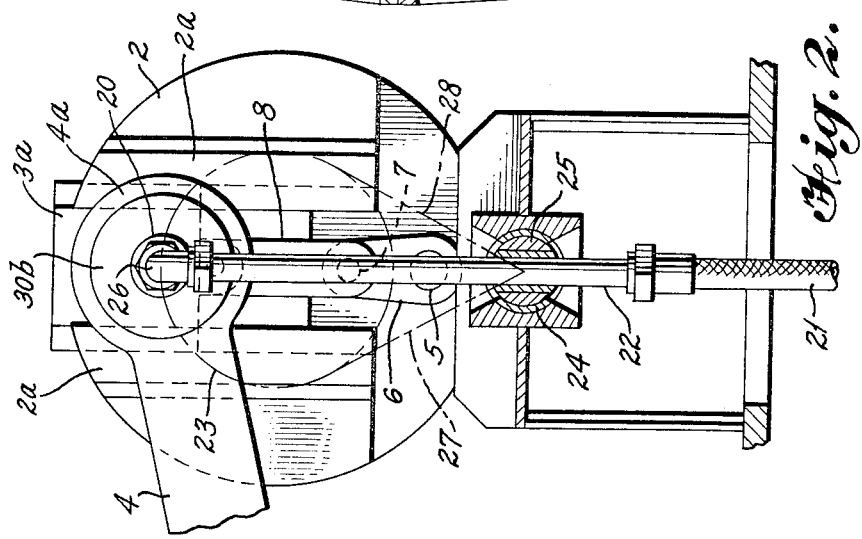

The invention will be further explained by means of an embodiment of a connecting rod drive in combination of the accompanying drawings in which:

FIG. 1 is a vertical section showing the crank in its upper dead center point, the crank being set to the maximum stroke and FIG. 2 is a section along line II—II of FIGURE 1 illustrating the introduction of the pressure medium into the rotating clamping device.

The oscillating crank shaft 1 is driven by a conventional driving motor and carries at its end a crank disk 2 having a crank stud 3 surrounded by a lug 4a of connecting rod 4 shown in FIGURE 2. The crank stud 3 extends through a slide shoe 3a which is guided in a dovetail guide 2a of crank disk 2 radially thereof. In order to adjust the stroke of the crank stud 3 a setting crank shaft 5 is mounted in the crank disk 2 eccentrically to the crank shaft 1. A crank arm 6 is fixed to setting crank shaft 5 and is connected over a crank pin 7 and over a short last member or connecting arm 8 pivotably with the slide shoe 3a. It is understood that the crank elements 6, 7 may be replaced by an eccentric member fixed to shaft 5.

The crank disk 2 carries also a transmission drive which consists of a gear 38 mounted on the setting shaft 5 and of the gears 9, 10, 11 and 12. The last gear 12 of this transmission drive is mounted eccentrically according to the invention, and is coupled with the gear ring 13a of a large drive gear 13 which is mounted on the oscillating crank shaft 1 in a freely rotatable manner. A pinion 15 which meshes with the drive gear 13 is movably mounted in bearing block 14, and shaft 16 of this pinion is rotatably connected to a drive motor not shown. A pinion 17 is also mounted in a stationary manner and meshes with gear wheel 13, and its shaft 18 leads to an indicator device for an electric shaft which when connected indicates the particular rotary position of the gear wheel 13.

When the shears or the oscillating drive are at a standstill, the drive gear 13 and the setting shaft 5 are adjusted over the pinion 15, whereby the slide shoe 3a is displaced in its guide so that the stroke of the crank stud 3 is altered. As will be described in greater detail hereafter, the safety lock of the crank stud 3 must be previously released. The number of rotations or the total angular displacement of the drive gear 13 is sensed over pinion 17 and indicated on a suitable control board over the electric shaft. The dial may be adjusted together with the particular crank stroke by considering the transmission ratio to gear 38 and the sine principle in the crank drive 5–8 is taken into account. When the position of the crank stud 3 is again locked the drive wheel 13 is again carried along during the operation of the shears through the blocked drive 8–12 so that only pinions 15 and 17 are rotating. The adjusting motor for pinion 15 and the signal transmission means connected to pinion 17 operate in this case without currents or at least without any affect.

In order to be able to control the oscillating amplitude of the shears exclusively from the control board the operation of the blocking of the crank stud 3 is mechanized according to the invention. In this process a hydraulic or pneumatic pressure medium is conducted to a clamping device indicated generally by A through a rotating connecting joint 20. According to the invention a rigid pipe 22 is arranged between a flexible line 21 and the connecting joint 20, which is guided linearly in the bore of a bolt 25 mounted in a bearing 24 and outside the crank circle 23 of the crank stud 3 as shown in FIGURE 2. During the rotation of the crank stud 3 the pipe 22 carries out a piston like movement which may be followed easily by the flexible line 21. The maximum deflections of the pipe 22 are indicated in FIGURE 2 by dash and dot lines 27 and 28. The connection of the elbow piece 26 of the pipe 22 at the connecting joint 20 must of necessity allow a rotation of the elbow piece relative to the clamping device A.

The clamping device consists, according to the invention, of a cylindrical member 30 which is passed over an extension 3b of the crank stud 3. A piston 31 is mounted at the end of the stud extension 3b and two locked ring nuts 32, 33 are fixed to this extension inwardly of the piston. A spring assembly 34 is arranged between the ring nuts 32 and 33 and a collar 30a of the cylinder 30. The collar 30a provides an abutment for the spring force which bears over a sleeve 36 passing through the bearing 35 of the connecting rod lug 4a against the crank disk 2.

When there is no pressure in the pressure chamber 37 of cylinder 30 the spring pressure urges the crank stud 3 over the ring nuts 32 and 33 toward the left in FIGURE 1 and the slide shoe 3a is thereby clamped against the inner surface of the slotted wall side of the dovetail guide 2a. The crank stud 3 is thus secured in position.

In order to release the clamping force, pressure is created in pressure chamber 37 which acts on piston 31 and on the cover 30b of the cylinder 30 and thus lifts the cylinder together with its collar 30a away from sleeve 36. In this way the spring force within the cylinder is checked and made ineffective so that no pulling force is exerted any longer on the crank stud 3 to lock it against the walls of the guide. The slide shoe 3a is thus released and may be adjusted in the above described manner.

What is claimed is:

1. A driving arrangement for the oscillating movement of the shear frame of flying shears comprising, in combination, a main crank shaft mounted for rotation in a bearing frame, a crank disk connected to said main crank shaft and having a radially extending guide channel, slide means disposed in said guide channel and carrying a crank stud extending parallel of said main crank shaft and actuating a connecting rod for imparting oscillating movement to said shear frame when said slide means together with said crank stud are in a secured position within the walls of said guide channel, a gear ring mounted freely rotatably on said main crank shaft, stationary drive means for rotating said freely rotatable gear ring relative to said main crank shaft, and adjusting means carried by and rotating with said crank disk including a first eccentrically disposed pinion gear coupled with said freely rotatable gear ring on said main crank shaft and a last member connected to said slide means for displacing said slide means together with said crank stud when said slide means is unlocked and said stationary drive means is actuated to vary the stroke of said crank stud.

2. A driving arrangement for the oscillating movement of the shear frame of flying shears comprising, in combination, a main crank shaft mounted for rotation in a bearing frame, a crank disk connected to said main crank shaft and having a radially extending guide channel, slide means disposed in said guide channel and carrying a crank stud extending parallel of said main crank shaft and actuating a connecting rod for imparting oscillating movement to said shear frame when said slide means together with said crank stud are in a secured position within the walls of said guide channel, a gear ring unitary with a gear wheel of greater diameter mounted freely rotatably on said main crank shaft, stationary drive means for rotating said freely rotatable gear wheel together with said gear ring relative to said main crank shaft, and adjusting means carried by and rotating with said crank disk including a first eccentrically disposed pinion gear coupled with said freely rotatable gear ring on said main crank shaft and a last member connected to said slide means for displacing said slide means together with said crank stud when said slide means is unlocked and said stationary drive means is actuated to vary the stroke of said crank stud.

3. A driving arrangement according to claim 2 including means coupled to said freely rotatable gear wheel for indicating its rotary position.

4. A driving arrangement for the oscillating movement of the shear frame of flying shears comprising, in combination, a main crank shaft mounted for rotation in a bearing frame, a crank disk connected to said main crank shaft and having a radially extending guide channel, slide means disposed in said guide channel and carrying a crank stud extending parallel of said main crank shaft and actuating a connecting rod for imparting oscillating movement to said shear frame when said slide means together with said crank stud are in a secured position within the walls of said guide channel, a gear ring mounted freely rotatably on said main crank shaft, stationary drive means for rotating said freely rotatable gear ring relative to said main crank shaft, and adjusting means carried by and rotating with said crank disk including a first eccentrically disposed pinion gear coupled with said freely rotatable gear ring on said main crank shaft, a last gear connected with a setting crank shaft disposed eccentrically of said main crank shaft and carried by said crank disk and a crank arm secured to said setting crank shaft and elbow-joined with a connecting arm pivotally connected to said slide means for displacing said slide means together with said crank stud when said slide means is unlocked and said stationary drive means is actuated to vary the stroke of said crank stud.

5. A driving arrangement for the oscillating movement of the shear frame of flying shears comprising, in combination, a main crank shaft mounted for rotation in a bearing frame, a crank disk connected to said main crank shaft and having a radially extending guide channel, slide means disposed in said guide channel and carrying a crank stud extending parallel of said main crank shaft and actuating a connecting rod for imparting oscillating movement to said shear frame when said slide means together with said crank stud are in a secured position within the walls of said guide channel, means for imparting axial movement to said crank stud to force said slide means into frictional locking engagement with the walls of said guide channel, a gear ring mounted freely rotatably on said main crank shaft, stationary drive means for rotating said freely rotatable gear ring relative to said main crank shaft, and adjusting means carried by and rotating with said crank disk including a first eccentrically disposed pinion gear coupled with said freely rotatable gear ring on said main crank shaft and a last member connected to said slide means for displacing said slide means together with said crank stud when said slide means is unlocked and said stationary drive means is actuated to vary the stroke of said crank stud.

6. A driving arrangement according to claim 5 wherein said means for imparting axial movement to said crank stud include, an abutment sleeve around said crank stud and positioned against said slide means, a cylinder disposed around said crank stud and having a collar for engaging said abutment sleeve at one side, a piston fixed to said crank stud and engaging the inner walls of said cylinder, biasing means disposed on said crank stud and engaging said collar at the other side, stop means on said crank stud for confining said biasing means, a cover for said cylinder and spaced from said piston to provide a pressure chamber, and means for feeding fluid pressure to said pressure chamber to actuate said piston for moving said crank stud axially relative to said slide means.

7. A driving arrangement according to claim 6 including a connecting joint pivotably connected to said cover, and conduit means for feeding fluid pressure to said pressure chamber.

8. A driving arrangement according to claim 7 wherein said conduit means include a pivotably supported rigid pipe section, and an elbow piece for connecting said rigid pipe section to said connecting joint.

References Cited by the Examiner

UNITED STATES PATENTS

| | | | |
|---|---|---|---|
| 2,211,418 | 8/1940 | Hallden | 74—69 |
| 2,336,044 | 12/1943 | Stuart | 74—600 |
| 2,653,662 | 9/1953 | Biggert | 74—600 |
| 2,730,345 | 1/1956 | Sloane | 74—675 X |

FRED C. MATTERN, Jr., *Primary Examiner.*

BROUGHTON G. DURHAM, *Examiner.*

J. A. MARSHALL, F. E. BAKER, *Assistant Examiners.*